(12) United States Patent
Watkins

(10) Patent No.: US 7,313,840 B2
(45) Date of Patent: Jan. 1, 2008

(54) INDUCTION LIQUID PUMP AND MAGNETIC TANK SCRUBBER

(75) Inventor: Charles E. Watkins, 4660 Hitching Post Trail, Atlanta, GA (US) 30342

(73) Assignee: Charles E. Watkins, Marietta, GA (US)

( * ) Notice: Subject to any disclaimer, the term of this patent is extended or adjusted under 35 U.S.C. 154(b) by 485 days.

(21) Appl. No.: 10/627,946

(22) Filed: Jul. 25, 2003

(65) Prior Publication Data

US 2004/0018104 A1 Jan. 29, 2004

Related U.S. Application Data

(60) Provisional application No. 60/398,517, filed on Jul. 25, 2002.

(51) Int. Cl.
*A47L 1/09* (2006.01)
*A47L 1/00* (2006.01)

(52) U.S. Cl. .................. 15/103; 15/220.2; 15/22.2; 15/28

(58) Field of Classification Search ............ 15/220.2, 15/103, 22.2, 28; 366/273–274; 119/264, 119/245; 114/222
See application file for complete search history.

(56) References Cited

U.S. PATENT DOCUMENTS

| | | | | |
|---|---|---|---|---|
| 1,357,869 A * | 11/1920 | Howard, Sr. | ............. | 15/250.11 |
| 2,941,477 A | 6/1960 | Dalton | ............. | 103/87 |
| 3,461,476 A * | 8/1969 | North | ............. | 15/250.04 |
| 3,481,586 A | 12/1969 | Roberts | ............. | 259/96 |
| 3,489,095 A | 1/1970 | Ehelm | ............. | 103/87 |
| 3,512,646 A | 5/1970 | Willinger | ............. | 210/169 |
| 3,554,630 A * | 1/1971 | Zipperer | ............. | 366/110 |
| 3,646,630 A * | 3/1972 | Russell | ............. | 15/302 |
| 3,983,591 A * | 10/1976 | Ohtaki et al. | ............. | 15/28 |
| 4,093,547 A | 6/1978 | Sherman et al. | ............. | 210/169 |

(Continued)

FOREIGN PATENT DOCUMENTS

DE       3630324 A1 *   3/1988

(Continued)

OTHER PUBLICATIONS

English translation of DE 3,630,324, Klein, Oct. 1988.*

(Continued)

*Primary Examiner*—Laura Guidotti
(74) *Attorney, Agent, or Firm*—Nelson Mullins Riley & Scarborough, L.L.P.

(57) ABSTRACT

An induction liquid pump includes a power unit and a circulation unit that are oppositely mountable to a tank with a plurality of fixation units. The liquid pump power unit includes a power induction unit to produce a variable magnetic field. The submersible liquid pump circulation unit includes an impeller unit to agitate or induce liquid flow in response to the variable magnetic field. A magnetic scrubber includes a power unit and a pad unit. The scrubber power unit produces a variable magnetic field in response to supplied power. When the scrubber power unit is held against a first surface of a tank, the scrubber pad unit is held oppositely against a second surface of the tank. The scrubber pad unit moves in response to the variable magnetic field to scrub the second surface of the tank.

15 Claims, 9 Drawing Sheets

U.S. PATENT DOCUMENTS

| | | |
|---|---|---|
| 4,266,914 A | 5/1981 | Dickinson .................... 417/63 |
| 4,406,591 A | 9/1983 | Louis ......................... 417/363 |
| 4,507,947 A | 4/1985 | Stanley ........................ 72/130 |
| 4,512,724 A | 4/1985 | Horvath ....................... 417/319 |
| 4,601,821 A | 7/1986 | Sherman et al. ............ 210/169 |
| 4,894,151 A | 1/1990 | Woltmann .................. 210/169 |
| 4,934,187 A | 6/1990 | Woltman ...................... 73/198 |
| 5,282,727 A | 2/1994 | Willinger et al. ...... 417/423.15 |
| 5,282,962 A | 2/1994 | Chen ......................... 210/169 |
| 5,290,157 A | 3/1994 | Willinger et al. ...... 417/423.15 |
| 5,380,160 A | 1/1995 | Chen ........................... 417/65 |
| 5,599,175 A | 2/1997 | Tojo et al. .................. 417/420 |
| 5,692,885 A | 12/1997 | Langer ....................... 417/420 |
| 6,634,052 B2 * | 10/2003 | Hanson ..................... 15/220.2 |
| 6,988,290 B2 * | 1/2006 | Enoch et al. ................. 15/103 |

FOREIGN PATENT DOCUMENTS

WO     WO 01/00077    *   4/2001

OTHER PUBLICATIONS

Webpage—Second Nature Power Heads Nov. 13, 1996.
Webpage—Water Pumps, Power Heads & Plumbing Supplies Nov. 13, 1996.

* cited by examiner

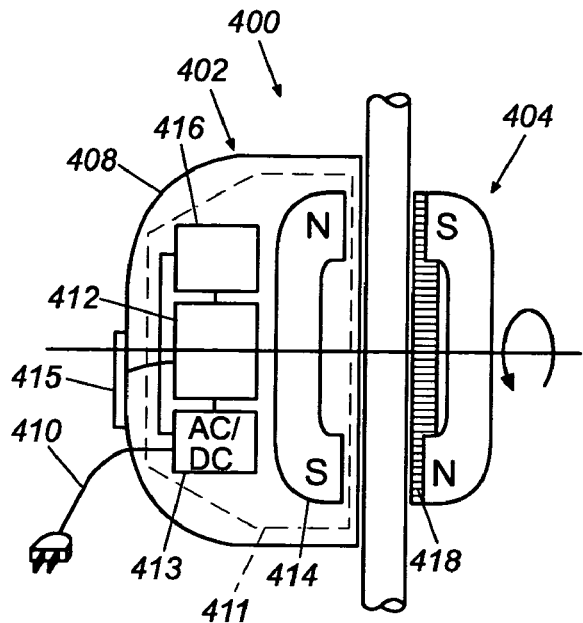
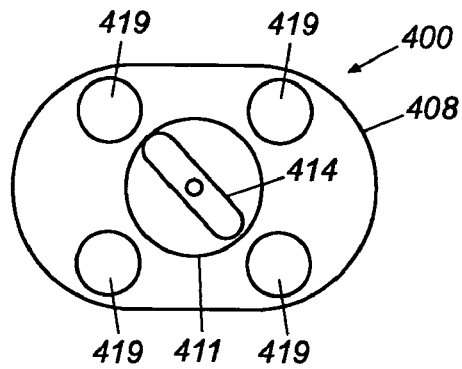
Fig. 17  Fig. 17A
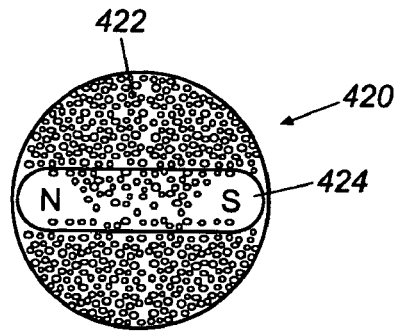
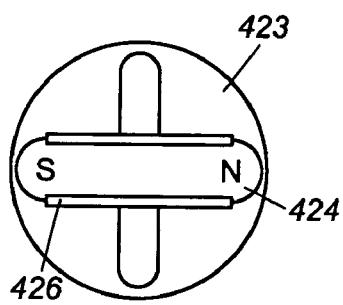
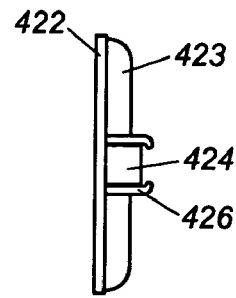
Fig. 18  Fig. 19  Fig. 20
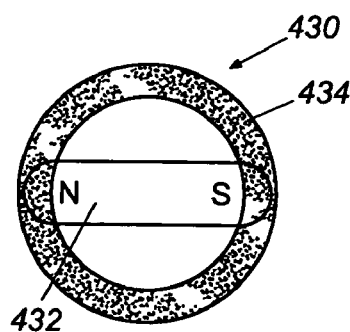
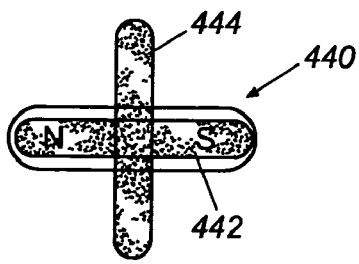
Fig. 21  Fig. 22

INDUCTION LIQUID PUMP AND MAGNETIC TANK SCRUBBER

This application claims priority to U.S. Provisional Application No. 60/398,517, filed on Jul. 25, 2002, the entire disclosure of which is incorporated by reference herein.

TECHNICAL FIELD

The present invention relates generally to the art of liquid pumps, also known as "power heads," and to the art of tank scrubbers. More particularly, the present invention relates to the art of aquarium water pumps wherein power is transmitted through an aquarium tank wall. The present invention also relates to the art of magnetic tank scrubbers wherein power to agitate the scrubber is transmitted through an aquarium tank wall.

BACKGROUND OF THE ART

Aquariums and other simulated environments often require the use of agitated water either to support life and/or to add to environmental aesthetic appeal. In fact, aesthetics are of paramount importance in the creation of a simulated habitat. A properly simulated environment will reduce stress on living creatures and increase owner enjoyment.

Water pumps find particular application in simulated aquatic environments, surface environments and amphibious environments. Water pumps are also used in hydroponics, simulated waterfalls, liquid based moving sculptures, and novelty items. However, one of the most popular water pump applications is the aquarium fish tank. A water pump, also known in the aquarium industry as a "power head" or "powerhead," is conventionally used to draw water from underneath a chamber in the base of the tank. The water may be drawn by the water pump through tank gravel in the bottom of the tank or may be drawn through a perforated plate or filter. The drawn water is then directly injected into the tank to create agitation or is drawn into a riser tube to the surface of the tank for treatment, aeration or filtration.

A filtration mechanism is conventionally employed to filter pollutants from the water and an aeration mechanism is also conventionally employed to oxygenate the water. Larger aquarium tanks may utilize a plurality of water pumps to provide multiple points of filtration and aeration, and also to provide multiple points of increased agitation and turbidity. The water pump may also be employed to simulate current in the aquatic environment, and to thereby reduce stress on certain types of marine life.

A conventional household aquarium water pump includes an electric motor, which is generally plugged into a conventional household power source operating at 110 volts and drawing a maximum current of 15 amps. An electric power cord is conventionally employed to provide continuous and uninterrupted power to the electric motor. However, the cord itself presents an obstacle to the functional and aesthetic aspects of the aquatic environment. The electric power cord may also present a danger to the habit through a possibility of electrocution.

The aquarium environment generally reflects the tastes and opinions of its owner as well as meeting functional needs for proper habitat simulation. Due to the virtually limitless variety of simulated environments, a degree of flexibility in placement of the aquarium water pump within the tank is desired. The power cord found on conventional aquarium water pumps limits flexibility in habitat design.

Various patents have been directed to problems associated with the aquarium environment. Chen, U.S. Pat. No. 5,380,160, relates to a conventional power head assembly for a protein skimmer. Chen incorporates a conventional impeller into a powered housing unit, which may be affixed to the interior of a tank via suction cups. A water-air mixing pump is formed as part of an elaborate mixing apparatus, which is submerged into the aquarium tank.

Willinger, et al., U.S. Pat. No. 5,282,727, relates to an aquarium power head with integrated muffler. A power head includes an electric motor having a sealed stator to induce movement in a corresponding rotor. The rotor in turn drives an impeller to induce water motion. The components of the power head are enclosed within a housing.

Woltmann, U.S. Pat. No. 4,894,151, relates to a power head that is supplied with electricity by way of an electrical power cord. Woltmann illustrates that the conventional power cord is commonly draped over the side of an aquarium tank.

The aquarium tank itself is periodically cleaned to prevent build up of scale, mineral deposits and algae. While a drained aquarium tank may be easily cleaned with a manual scrubbing pad, a full aquarium tank presents a number of cleaning challenges. When the conventional aquarium is filled with water, one is required to place hands within the tank environment, or to employ a submergible cleaning tool. Generally, the cleaning tool is a brush attached to an elongated handle, with the tool being manipulated above the water line. However, the elongated handle is subject to flex during use, which decreases control and ease of cleaning. Further, in larger tanks, the elongated cleaning tool may not be easily manipulated while at the same time adequately viewing the surface to be cleaned. Moreover, some tanks present a closed system wherein manipulation of a cleaning device from above the water line is prohibited.

Accordingly, it is desirable to provide water aeration, agitation and filtration, without introduction of an electric power cord into the aquatic environment. It is further desirable to provide a self contained aeration and/or filtration apparatus that does not require components that breach the water surface.

It is also desirable to provide an aquarium scrubber that may be easily moved about the interior of an aquarium tank without manipulation from above the top of the tank. Further, it is desirable to provide a powered aquarium scrubber that may be controlled from a position external to tank.

SUMMARY

The present invention addresses, among others, the aforementioned problems and limitations in the art. An induction liquid pump includes a power unit and a circulation unit that are mountable to a tank wall. The power unit includes a power induction unit to produce a variable magnetic field. The circulation unit is submersible and mountable opposite to the power unit. The circulation unit includes a circulation induction unit to agitate a surrounding liquid in response to the variable magnetic field. The circulation induction unit includes a rotor attached to an impeller unit that rotates in response to the variable magnetic field. Rotation of the impeller unit induces liquid flow when submersed in liquid. A first plurality of fixation units are attached to the power unit and a second plurality of fixation units are attached to the circulation unit. These fixation units respectively attach both of the power unit and the circulation unit to the tank.

An induction liquid pump includes a power unit and a circulation unit. The power unit includes at least one electrically conductive power coil disposed within a power unit body casing. The power coil produces a varying magnetic field in response to received electrical power. Alternatively, the power coil is replaced by a motor drive and rotatable permanent magnet. The circulation unit includes at least one circulation coil disposed within a circulation unit body casing. The circulation coil produces power to rotate an impeller assembly in response to the varying magnetic field generated by the power unit. The power unit is removably or permanently affixed to a first surface of a tank side wall or bottom and the circulation unit is removably or permanently affixed to a second surface of the side wall or bottom, opposite the power unit. When the tank is filled with liquid, the impeller assembly produces agitation of the liquid. A body casing of the circulation unit defines an intake port connected to an output port by way of an internal liquid pathway. The impeller assembly draws liquid into the intake port and out of the output port.

A magnetic scrubber includes a power unit having a power unit body casing housing a power induction unit. The power unit produces a magnetic field in response to supplied power which may be varied by the user in either the power and/or polarity of the power unit magnet or electromagnet. A pad unit containing at least one permanent magnet moves in response to the variable magnetic field created by the power unit. When the power unit is held against a first surface of a tank side wall or bottom by an operator, the movable pad unit is held against a second surface of the tank side wall by way of magnetic attraction. The pad unit moves in response to the variations in the force and polarity of the magnetic field created by the power unit. The pad unit includes a rotatable pad section that rotates to scrub the second surface of the tank side wall. The power unit may provide the operator with the ability via a control surface, like a dial, to increase or decrease the attraction between the power unit and the movable pad or the rate of agitation or spin of the movable pad.

The aforementioned and other objects, features and advantages of the invention will be apparent to those of ordinary skill in the art in view of the following detailed description and associated drawings, and are in no way intended, nor should they be construed, to limit the scope of the invention.

BRIEF DESCRIPTION OF THE DRAWINGS

FIG. 17 is partial sectional view of a magnetic tank scrubber unit according to an embodiment of the present invention.

FIG. 17A is a schematic front view of magnetic tank scrubber unit according to an embodiment of the present invention.

FIG. 18 is a front view of a magnetic tank scrubber pad unit according to an embodiment of the present invention.

FIG. 19 is a rear view of the magnetic tank scrubber pad unit of FIG. 18.

FIG. 20 is a side view of the magnetic tank scrubber pad unit of FIG. 18.

FIG. 21 is a front view of a magnetic tank scrubber pad unit according to another embodiment of the present invention.

FIG. 22 is a front view of a magnetic tank scrubber pad unit according to another embodiment of the present invention.

DETAILED DESCRIPTION

Figure 1A:
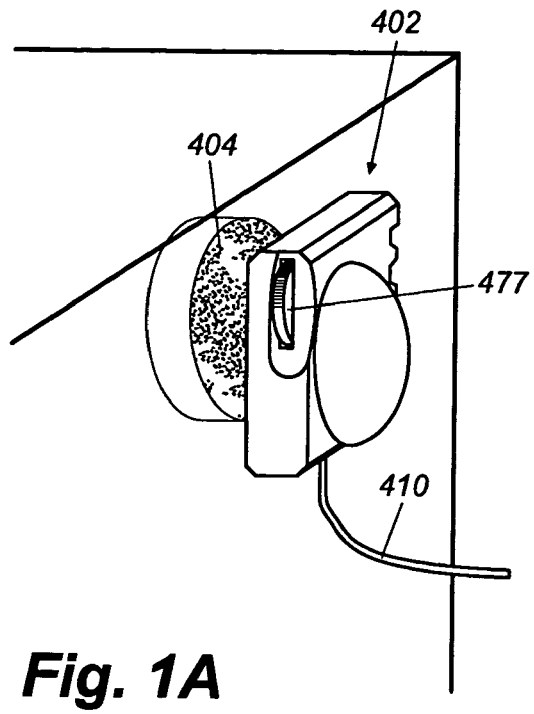
FIG. 1A is an elevated view of the corner of an aquarium and an electric glass scrubber according to the preferred embodiment of the present invention.

Referring now to the drawings, and in particular FIG. 1A, wherein like reference numerals are intended to refer to like parts throughout, embodiments of the present invention are shown and described. FIG. 1A illustrates an elevated view of the corner of an aquarium 100 and an electric glass scrubber, comprised of a power unit 402 and pad unit 404, according to the preferred embodiment of the present invention. Power unit 402 is of a size such that it fits easily into an adult human hand, and is comprised of at least one electromagnet (not shown) and control unit (not shown) that produce a variable magnetic field in response to power supplied by a power cord 410. Said variable magnetic field can be controlled in the force of magnetic attraction and/or polarity by way of a dial 477 or other control surface. Said variable magnetic field induces movement in the pad unit 404 by influencing at least one permanent magnet or other suitable material such as a ferrous material that responds to a magnetic field (not shown) encased within pad unit 404 by a water impermeable material. In a preferred embodiment, said pad unit 404 is rendered positively buoyant in water by the material encasing the permanent magnet or by the inclusion of hollow pockets in the pad unit 404.

Figure 1B:
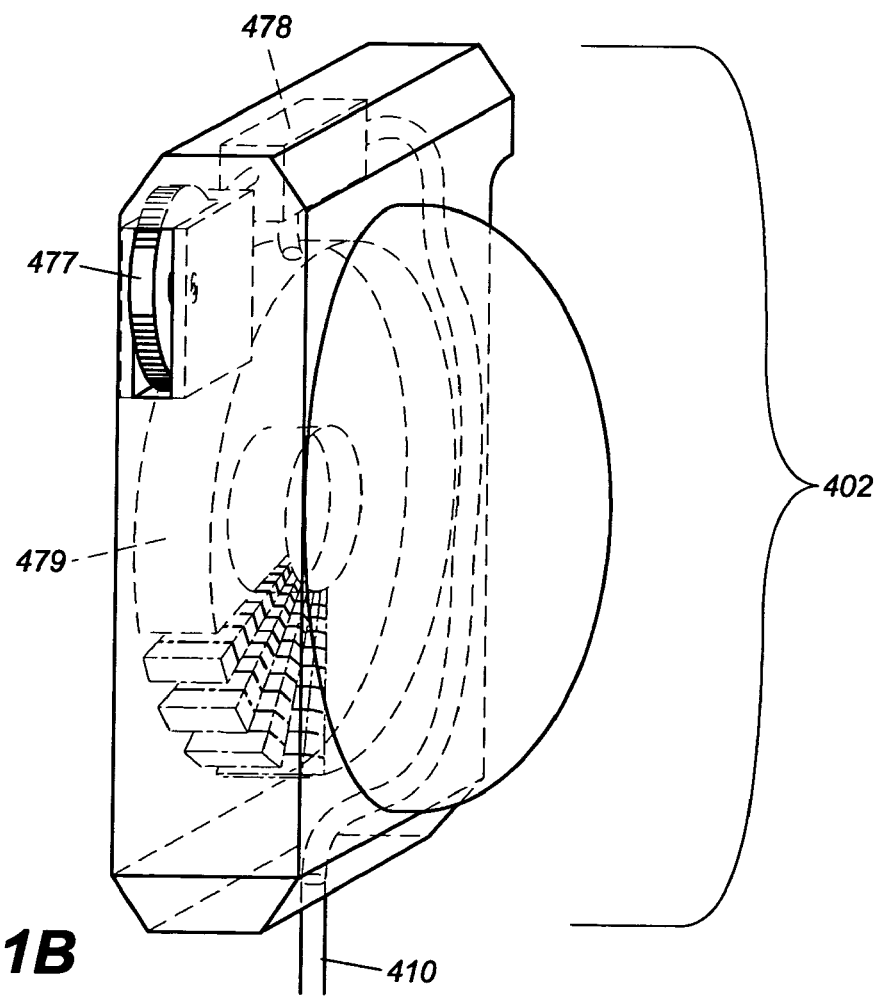
FIG. 1B is a partial sectional view of an electric glass scrubber according to the preferred embodiment of the present invention.

FIG. 1B is a sectional view of the power unit 402 of electric glass scrubber shown in FIG. 1A according to the preferred embodiment of the present invention. According to this embodiment, power unit 402 is comprised of a circular arrangement of electromagnets 479, a control unit 478, and control surface dial, powered by an electrical cord 410. According to this embodiment, power is supplied to the electromagnets 479 from an electrical cord 410 through the control unit 478. The control unit 478 varies the flow of electricity around the electromagnets 479 in a manner such that the electromagnets are polarized in a series which move around the circular arrangement of electromagnets 479 to influence the permanent magnet within the pad unit 404 to rotate and thereby rotate the pad unit 404. The user of the magnetic scrubber may also increase or decrease the electrical flow to the electromagnets 479 in the control unit 402, and thereby the force of magnetic attraction exerted by the power unit 402 electromagnets 479, by dialing the control surface 477 up or down. By increasing the force of magnetic attraction between the power unit 402 and the pad unit 404, the scrubbing pressure exerted by the pad unit 404 can be controlled.

Figure 1C:
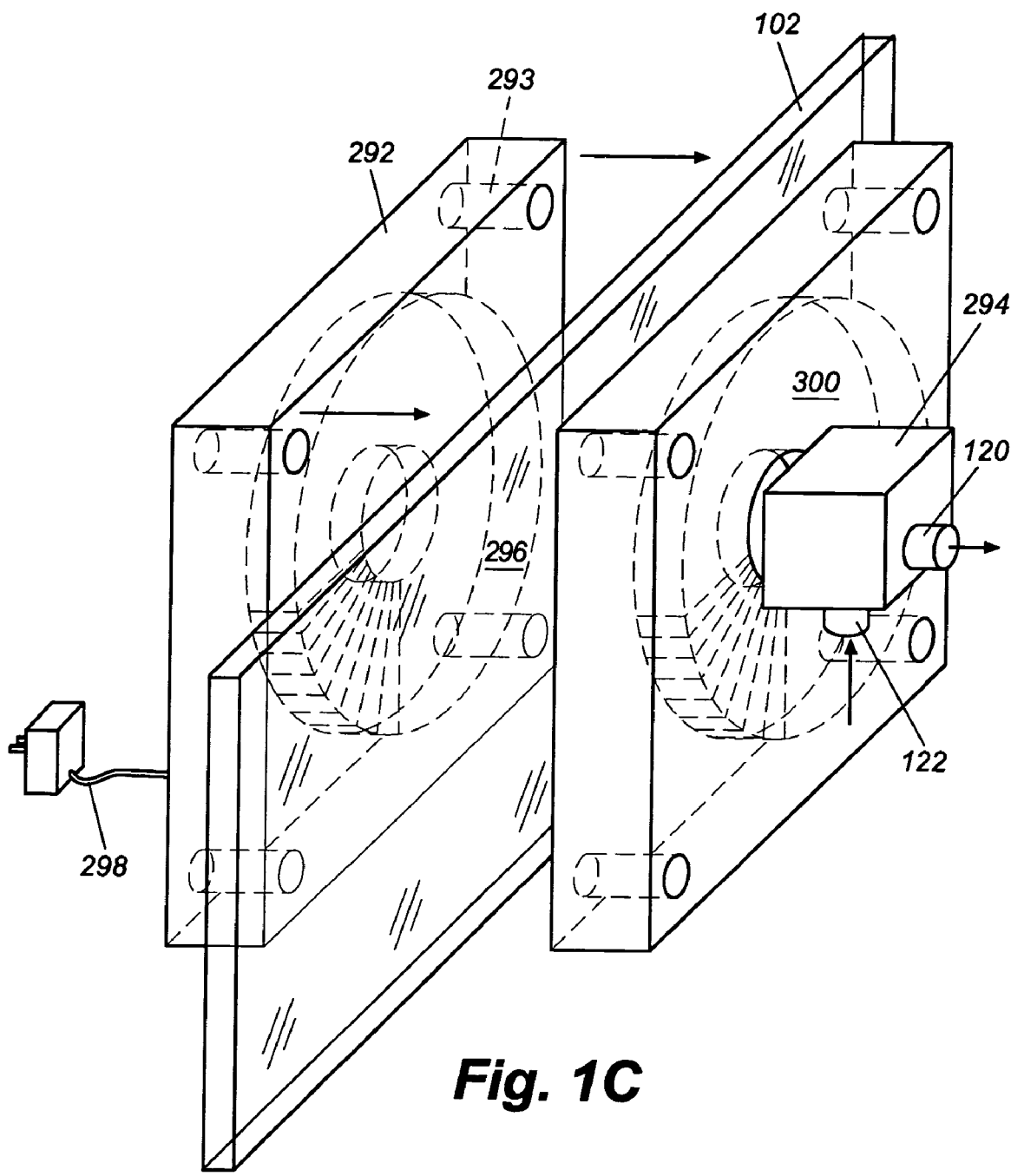
FIG. 1C is a sectional view of an induction liquid pump according to the preferred embodiment of the present invention.

FIG. 1C is a sectional view of an induction liquid pump according to the preferred embodiment of the present invention. Liquid pump is comprised of two major components, namely power unit 292 and circulation unit 294. Power unit 292 is connected to a power source (not shown) by way of plug section 298. According to an embodiment, the power source is a continuous alternating current power source. According to a preferred embodiment, the power source is a conventional household power source operating at 110 volts and drawing a maximum current of 15 amps.

Power unit 292 receives power by way of plug section 298 and inductively transmits the power through the wall 102 to circulation unit 294. The circulation unit 294 draws liquid from intake port 120 and outputs liquid through output port 122 in response to the inductively transmitted power, as an axial flux induction motor. As illustrated, intake port 120 and output port 122 are offset by 90 degrees. According to this embodiment of the present invention, permanent magnet fixation units 293 are located on the corners of the power unit 292 and circulation unit 294 to assist the user in properly aligning the magnets 296 and 300 of the power unit 292 and circulation unit 294 and to hold the magnets 296 and 300 of the power unit 292 and circulation unit 294 in proper alignment during operation.

Figure 1:
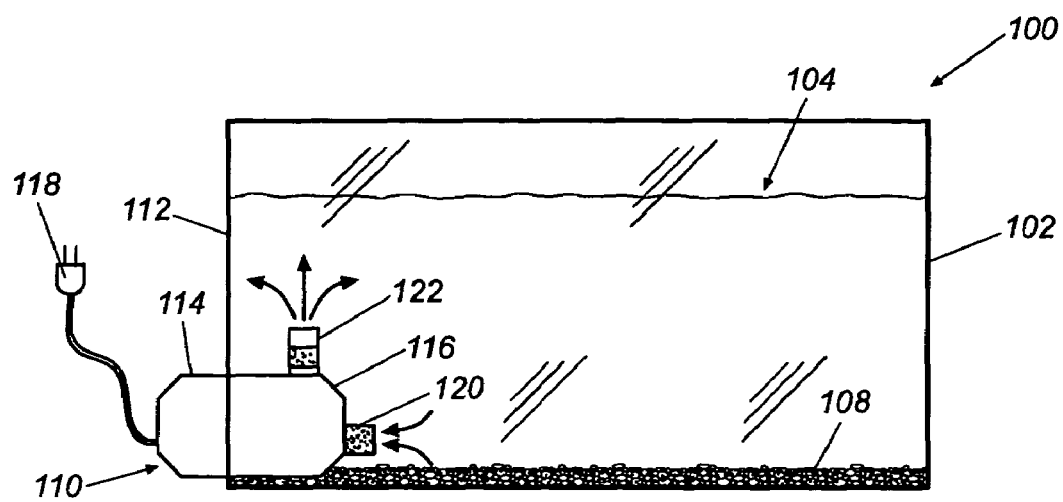
FIG. 1 is an elevated front view of an aquarium incorporating an induction liquid pump according to an embodiment of the present invention.

FIG. 1 illustrates an elevated front view of a liquid tight aquarium tank 100 having a plurality of sides 102 that envelop and hold liquid 104. The bottom of tank 100 supports gravel base 108. According to the illustrated embodiment, aquarium tank 100 is an indoor fresh water or salt water aquarium tank, which is typically on the order of ten to one hundred gallons in capacity. Indoor aquarium tanks may also range from a single gallon to hundreds of gallons, while still maintaining a self contained aquatic environment.

Induction liquid pump 110 is shown in an optional location affixed with respect to side wall 112 of aquarium 100. Liquid pump 110 is comprised of two major components, namely power unit 114 and circulation unit 116. Power unit 114 is connected to a power source (not shown) by way of plug section 118. According to an embodiment, the power source is a continuous alternating current power source. According to a preferred embodiment, the power source is a conventional household power source operating at 110 volts and drawing a maximum current of 15 amps.

Power unit 114 receives power by way of plug section 118 and inductively transmits the power through side wall 112 to circulation unit 116. The circulation unit 116 draws liquid from intake port 120 and outputs liquid through output port 122 in response to the inductively transmitted power. As illustrated, intake port 120 and output port 122 are offset by 90 degrees. Accordingly, intake port 120 may be optionally placed below gravel base 108 and draws liquid through a conventional under gravel filter (not shown). Intake port 120 is optionally fitted with an intake assembly (not shown) to uniformly draw liquid about a predetermined area with respect to gravel base 108. Output port 122 may be optionally fitted with a tubing member to output liquid to a remote location. Output port 122 may be optionally fitted with an aeration tube drawing air from the surface or air pump, which injects drawn air into output liquid. Output port 122 or intake port 120 may be optionally fitted with an assembly containing biological or mechanical filtration medias, including but not limited to charcoal, non-biodegradable fibers or substrates for biological filtration. Output port 122 and intake port 120 may optionally be divided into multiple output parts (not shown) or intake parts (not shown).

Figure 2:
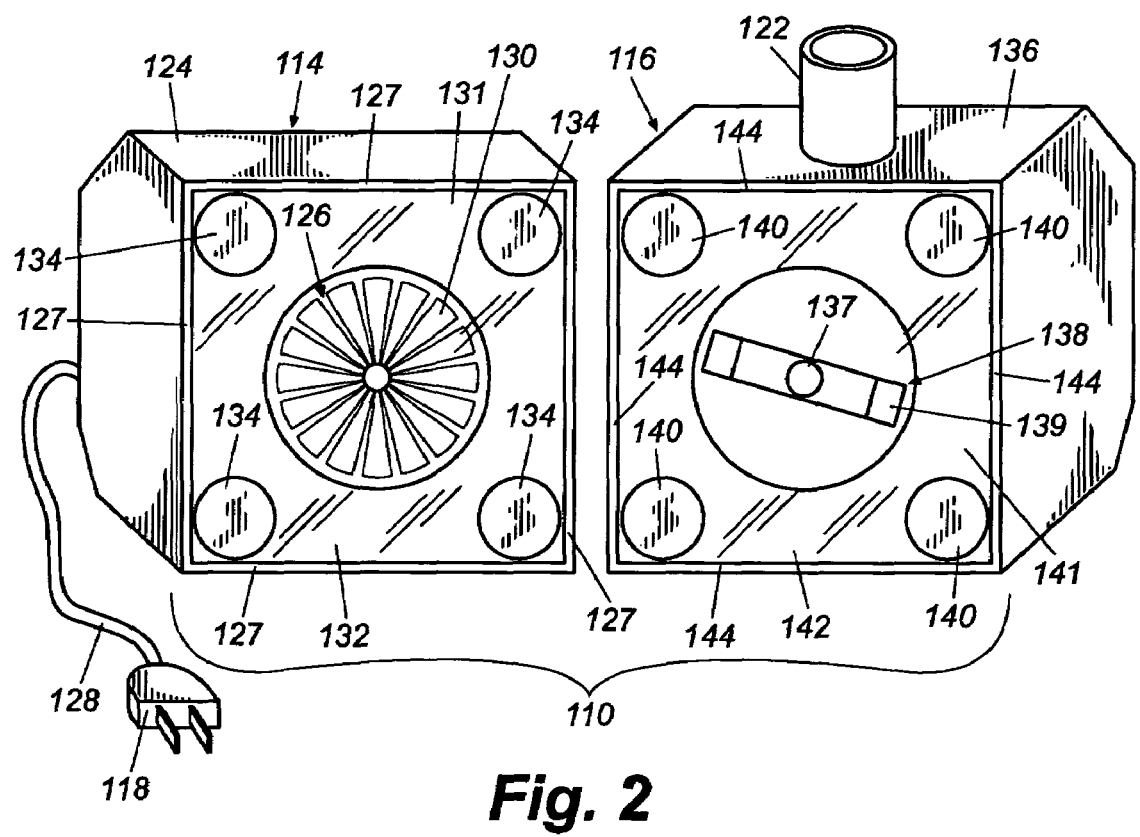
FIG. 2 is an elevated perspective view of an induction liquid pump according to an embodiment of the present invention.

FIG. 2 is an elevated perspective view of induction liquid pump 110 including power unit 114 and circulation unit 116. Power unit 114 is defined about an outer perimeter by body casing 124. Plug section 118 connects to power induction unit 126 by way of electrical cord 128. Power induction unit 126 is a stator having a plurality of coils 130. Power induction unit 126 does not move and is held in place by friction contact with body casing 124.

When power induction unit 126 forms a stator, each of the coils in the stator is preferably comprised of copper wire that is wound about a corresponding iron core. The core may optionally be made of any material which can be magnetized. The wire may optionally be made of any electrically conductive material.

Alternatively, the stator is formed of an iron core obtained by winding iron tape in a toroidal fashion. In this case, the surface of the stator core is slotted in the radial direction. The coils of the stator core are then wound in a toroidal fashion around the stator core and placed into the slots. The iron tape may optionally be made of any electrically conductive material.

Body casing 124 defines a plurality of ridges 127 that protrude outwardly from the face 131 of power unit 114. According to the embodiment of FIG. 2, power induction unit 126 is stationary and is covered by liquid tight film 132. Film 132 is preferably a thermoplastic resin that is poured over power induction unit 126 after insertion into body casing 124. The ridges 127 ensure that film 132 completely covers power induction unit 126 when the film is in a plastic state during manufacture.

Power unit 114 includes a plurality of fixation units 134 disposed about the face 131 of body casing 124. Fixation units 134 are configured and arranged to affix face 131 of body casing 124 to side wall 112 of aquarium tank 100. According to an embodiment of the invention, fixation units 134 are not covered with film 132. According to another embodiment of the present invention, fixation units 134 are covered with film 132 such that face 131 is provided as a completely smooth surface.

Circulation unit 116 includes body casing 136 for housing internal components. Circulation induction unit 138 is configured and arranged to be aligned with power induction unit 126 on an opposing side of aquarium side wall 112. Preferably, circulation induction unit 138 includes a rotor 139 that moves in response to a variable magnetic field produced by power induction unit 126. Rotor 139 is a rotatable bar magnet 139 that rotates about rotation axis 137. According to an embodiment, magnet 139 is made from an iron core. According to an alternative embodiment, magnet 139 is made of any magnetized material.

Circulation induction unit is covered by liquid tight film 142. Film 142 is preferably a thermoplastic resin that covers circulation induction unit 138 after insertion mounting into body casing 136. Ridges 144 form an outer periphery of face 141. Circulation unit 116 includes a plurality of fixation units 140. According to an embodiment of the invention, fixation units 140 are not covered with film 142. According to another embodiment of the invention, fixation units 140 are covered with film 142 such that face 141 is provided as a completely smooth surface.

Figure 3:
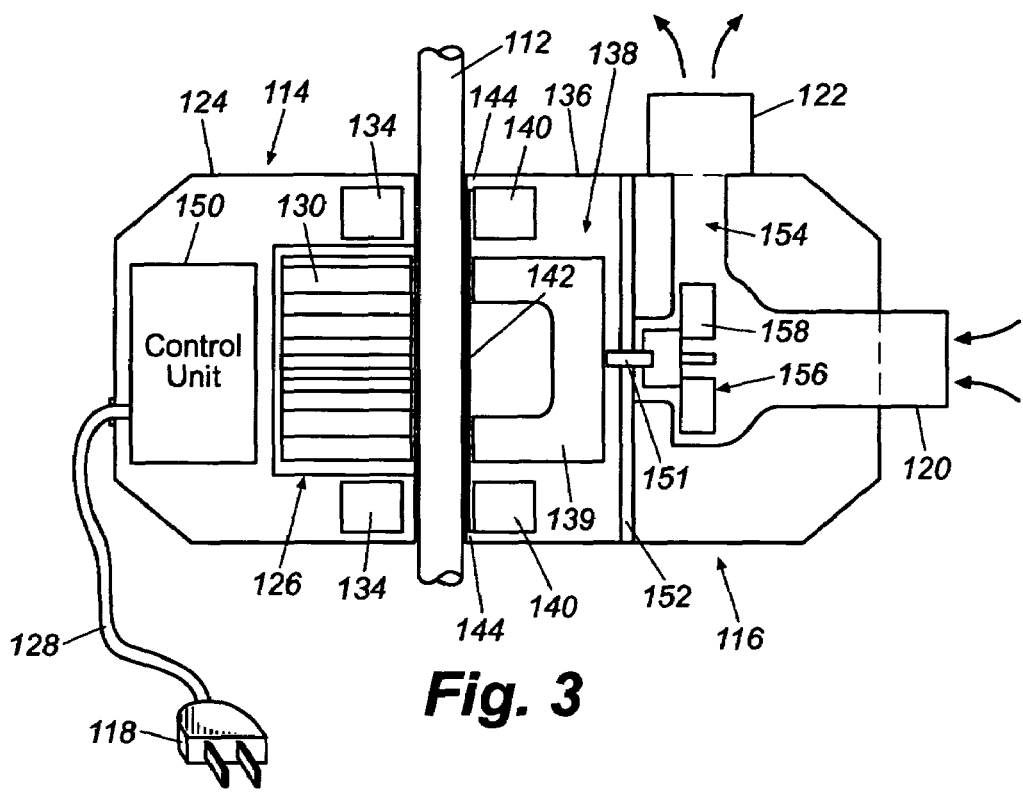
FIG. 3 is a sectional view of an induction liquid pump according to an embodiment.

FIG. 3 is a sectional view of induction liquid pump 110 according to an embodiment of the invention. As illustrated, conventional household power is supplied from plug section 118 to control unit 150. The control unit sequentially supplies power to each of the coils 130 in power induction unit 126. The sequential supply of power to coils 130 simulates the rotation of a magnet about a central axis.

Circulation unit 116 includes circular induction unit 138, which includes rotor 139 in the form of a rotatable bar magnet. The rotatable bar magnet is disposed in a cavity beneath film 142. As illustrated, rotor 139 is supported by way of rotation axis 151 to partition member 152. In this case, partition member 152 provides a liquid tight barrier to protect the magnet forming rotor 139. Alternatively, the magnet is covered with a liquid tight non-corrosive substance, such as a fluorocarbon polymer. Preferably, the magnet 180 is coated with PTFE, sold under the trademark Teflon (R).

Rotor 139 is schematically illustrated in FIG. 2 as a single bar magnet having a pair of poles. In this embodiment, two of the coils 130 in stator 126 are activated at a time to induce motion in rotor 139. According to an alternative embodiment, a plurality of pairs of coils 130 are simultaneously activated in power induction unit 126 to induce motion in a corresponding plurality of pole pairs in rotor 139.

Rotation axis 151 rotates impeller unit 156 in response to rotation of bar magnet 139. As illustrated, impeller unit 156 includes a plurality of blades 158. Body casing 136 defines internal liquid pathway 154. Accordingly, during rotation of impeller unit 156, liquid is drawn into intake port, passes through liquid pathway 154, and exits out of output port 122.

FIG. 3 particularly illustrates fixation units 134 and 140 in the form of opposed bar magnets. By way of example, the north poles of fixation units 134 face side wall 112 while the south poles of fixation units 140 face side wall 112. Magnetic attraction aligns power unit 114 to circulation unit 116 to thereby maintain alignment of power induction unit 126 with rotatable bar magnet 139. Fixation units 134 and 140 may optionally provide fixation in combination with suction cups set forth in greater detail below. Fixation may optionally be accomplished or enhanced with adhesives in lieu of or in addition to suction cups or magnets. As used herein the term "magnet," while referring to permanent magnets, may optionally refer to electromagnets.

Figure 3A:
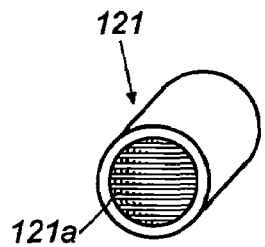
FIG. 3A is an elevated perspective view of a port cap according to an embodiment of the present invention.

FIG. 3A is an elevated perspective view of port cap 121 having an integrally formed grating 121a. Port cap 121 is configured and arranged to be placed over an outer diameter of a port in liquid circulation unit 116, such as intake port 120. Port cap 121 prohibits introduction of objects from aquarium tank 100 into liquid pump 110. Optionally, port cap 121 is integrally formed with one of the ports of circulation unit 116.

Figure 3B:
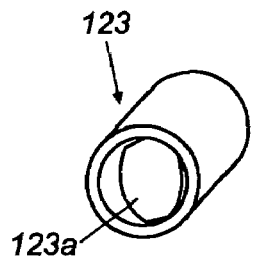
FIG. 3B is an elevated perspective view of a port cap according to another embodiment of the present invention.

FIG. 3B is an elevated perspective view of port cap 123 according to another embodiment of the present invention. Port cap 123 is configured and arranged to be placed over an outer diameter of a port in liquid circulation unit 116, such as output port 122. Port cap 123 includes a directional rudder 123a that controls an output direction of liquid exiting output port 122. Optionally, port cap 123 is integrally formed with one of the ports of circulation unit 116.

Figure 3C:
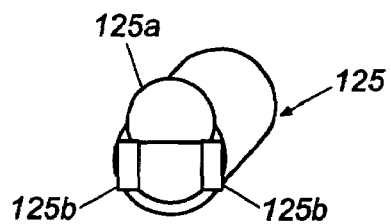
FIG. 3C is an elevated perspective view of a port cap according to yet another embodiment of the present invention.

FIG. 3C is an elevated perspective view of port cap 125 according to yet another embodiment of the present invention. Port cap 125 is configured and arranged to be placed over an outer diameter of a port in liquid circulation unit 116, such as intake port 120. Port cap 125 includes restriction member 125a that restricts liquid entering intake port 120. Restriction member 125a is movable along tracking members 125b such that the operator may control the amount of liquid entering or exiting from circulation unit 116. Optionally, port cap 125 is placed over output port 122 to restrict liquid exiting from circulation unit 116. Optionally, port cap 125 is integrally formed with one of the ports of circulation unit 116.

Figure 3D:
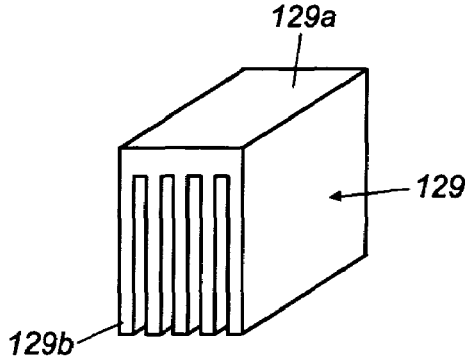
FIG. 3D is an elevated perspective view of a heat sink for the induction liquid pump according to an embodiment of the invention.

FIG. 3D is an elevated perspective view of heat sink 129 for induction liquid pump 110 according to an embodiment of the invention. Heat sink 129 is preferably made from aluminum and is optionally connected to power unit 114, circulation unit 116 or both and is optionally made from any heat conductive material. Heat sink 129 conducts heat away from a heat source by conductively connecting mounting surface 129a thereto. Radiator fins 129b then radiate heat away from the heat source. When connected to power unit 114, heat sink 129 radiates heat to the surrounding air, either inside or outside of body casing 124. When connected to circulation unit 116, heat sink 129 radiates heat to the surrounding water either inside or outside of body casing 136. Optionally, radiator fins 129b are placed within the stream of flowing liquid inside body casing 136. Optionally, heat sink 129 is coated with any non-corroding material to minimize the effects of corrosion.

Figure 4:
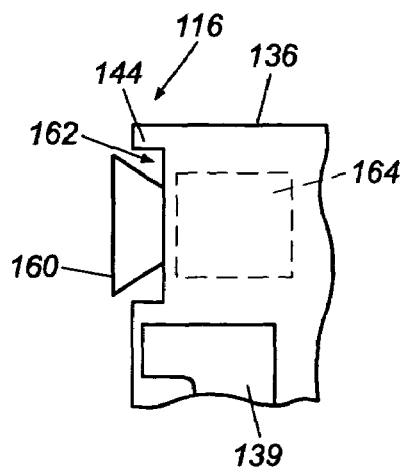
FIG. 4 is a partial sectional view of a fixation unit according to an embodiment of the present invention.

FIG. 4 is a partial sectional view of circulation unit 116 illustrating fixation unit 160 in the form of a suction cup. The embodiment of a suction cup may apply equally to all fixation units 134 of power unit 114. As illustrated, suction cup 160 is partially disposed within recess 162 and partially extends outwardly from recess 162. Upon elastic deformation of suction cup 160, the suction cup 160 deforms into recess 162 such that circulation unit 116 is maintained flush against side wall 112. Suction cup 160 may cooperate with optional permanent magnet 164 to hold circulation unit 116 in place.

Figure 5:
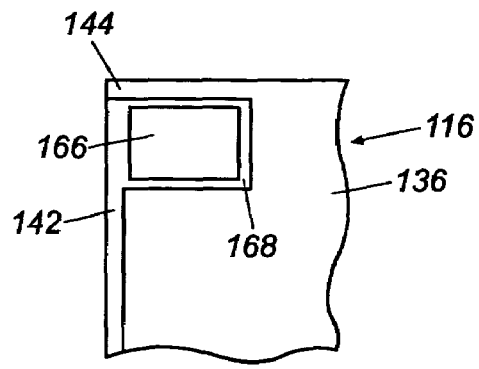
FIG. 5 is a partial sectional view of a fixation unit according to an embodiment of the present invention.

FIG. 5 is a sectional view of circulation unit 116 illustrating fixation unit 166 according to yet another embodiment of the present invention. According to the illustrated embodiment, fixation unit 166 is a permanent magnet disposed within recess 168 in body casing 136. Film 142 is used to encase magnet 166 in place. According to an embodiment, film 142 is a resin. According to another embodiment, film 142 is flexibly deformable to create and maintain suction with respect to side wall 112. According to an embodiment of the invention, fixation units 134 are formed in the same manner as fixation units 140 but with opposite attraction.

Figure 6:
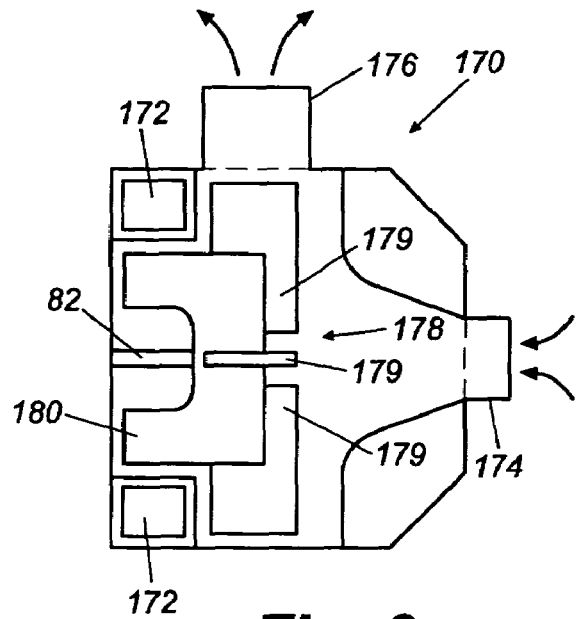
FIG. 6 is a partial sectional view of a circulation unit of an induction liquid pump according to an embodiment of the present invention.

FIG. 6 is a partial sectional view of circulation unit 170 according to an embodiment of the present invention. A plurality of fixation units 172 are provided to affix circulation unit 170 to a side wall surface (not shown). Liquid is drawn into intake port 174 and output from liquid output port 176 in response to movement of circulation induction unit 178. As illustrated, circulation induction unit 178 includes permanent magnet 180 that rotates in response to application of a varying magnetic field. Permanent magnet 180 circularly moves about rotation axis 182. According to this embodiment, permanent magnet 180 itself is coated with a non-corrosive material, such as a fluorocarbon polymer. Preferably, permanent magnet 180 is coated with PTFE, sold under the trademark Teflon (R). A plurality of blades 179 are affixed to magnet 180 to provide agitation and/or circulation to liquid within circulation unit 170.

Figure 7:
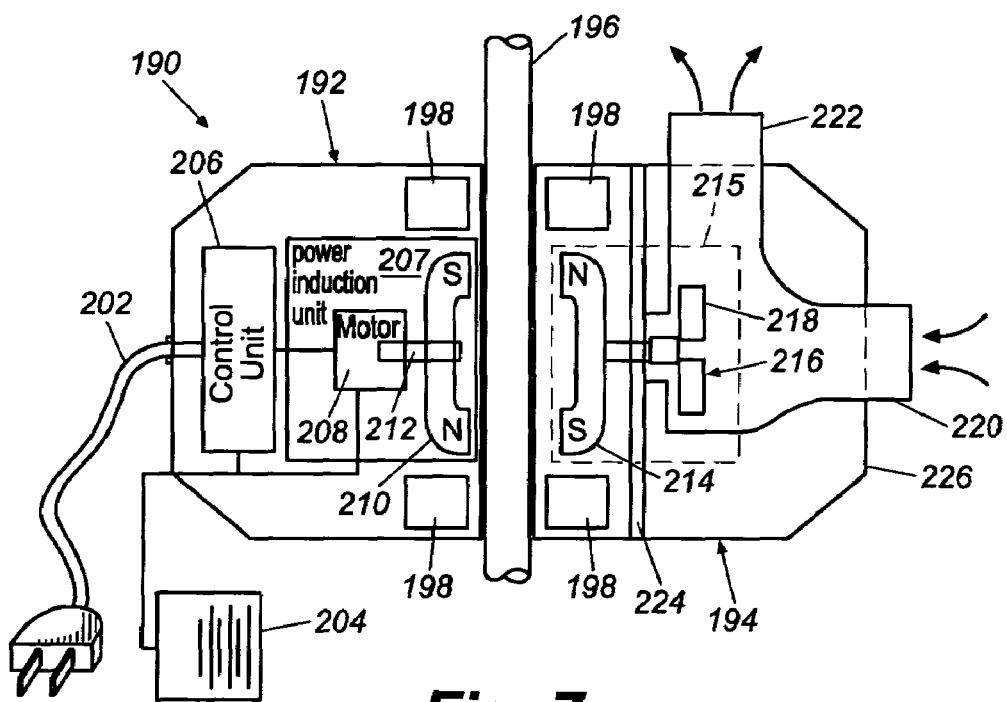
FIG. 7 is a partial sectional view of an induction liquid pump according to an embodiment of the present invention.

FIG. 7 is a partial sectional view of an induction liquid pump 190 according to an embodiment of the invention. Induction liquid pump 190 includes power unit 192 and circulation unit 194, which are respectively attached to side wall 196 by way of a plurality of fixation units 198. According to the embodiment of FIG. 13, conventional household power is supplied to power unit 192 by way of plug and power cord 202. According to another embodiment of the 20 invention, optional battery 204 is used to supply power to power unit 192 either alone or in combination with the plug and power cord. By using optional battery 204, induction liquid pump 190 maintains operation even if the household power is temporarily disabled. According to an embodiment of the invention, battery 204 is a rechargeable battery that is continually charged during supply of the household power.

Power cord 202 supplies household power to control unit 206 within power unit 192. Control unit 206 transfers power to power induction unit 207. According to an embodiment, power induction unit 207 includes electric motor 208 that rotates permanent magnet 210 about rotation axis 212. According to an embodiment of the invention, motor 208 is a direct current motor, and control unit 206 transforms household alternating current into direct current to drive motor 208. According to a preferred embodiment, motor 208 is an alternating current motor and control unit 206 is a switch to control the supply of current to the motor 208. According to an embodiment of the invention, control unit 206 selectively supplies current to charge battery 204 when household power is supplied by power cord 202, and selectively supplies current from battery 204 to motor 208 when household power is turned off.

Motor 208 rotates to thereby turn permanent magnet 210 about rotational axis 210. Rotation of magnet 210 induces motion in circulation induction unit 215 of circulation unit 194. In particular, magnet 210 induces rotation of permanent magnet 214 in by way of transfer of magnetic flux through the tank wall 196. As illustrated, the south pole of permanent magnet 210 attracts the north pole of permanent magnet 214, while the north pole of magnet 210 attracts the south pole of magnet 214. According to the illustrated embodiment, magnets 210 and 214 are curved magnets. However, according to an alternative embodiment, each bar magnet is replaced with a magnet assembly having a plurality of magnetic poles. Alternatively magnets 210 and 214 are straight bar magnets.

During operation of induction liquid pump 190, rotation of magnet 214 rotates impeller unit 216 to thereby induce agitation of the liquid in circulation unit 194. Preferably, impeller unit 216 has a plurality of flat blades 218. According to an alternative embodiment, impeller unit 216 includes a plurality of curved blades. During operation, circulation unit 194 creates agitation in the surrounding liquid by drawing liquid into intake port 220 and outputting liquid through output port 222. Magnet 214 rotates with respect to partition member 224, which is preferably integrally formed with body casing 226. Magnet 214 is protected from contact with liquid entering circulation unit 194 by way of partition member 224.

Figure 8:
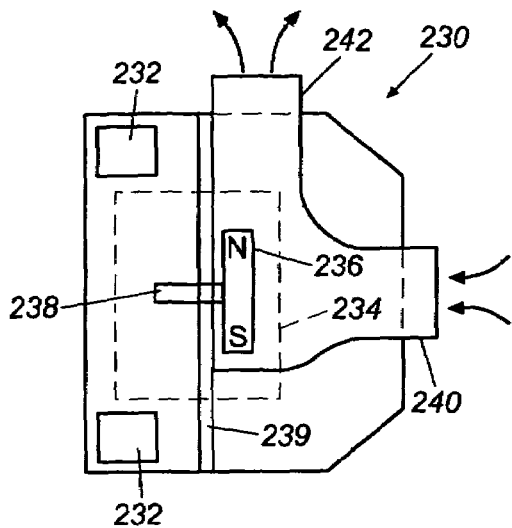
FIG. 8 is a sectional view of a circulation unit of an induction liquid pump according to yet another embodiment of the present invention.

FIG. 8 is a sectional view of circulation unit 230 of an induction liquid pump according to yet another embodiment of the present invention. Circulation unit 230 is affixed to a side wall (not shown) by way of a plurality of fixation units 232. According to the embodiment of FIG. 14, circulation induction unit 234 rotates within circulation unit 230 to induce agitation of the surrounding liquid. In particular, permanent magnet 236 is induced to rotate about rotation axis 238, to thereby agitate liquid within circulation unit 230. Rotation axis 238 is rotationally mounted to housing wall 239. Magnet 236 itself acts as impeller to draw liquid into intake port 240 and out of output port 242. According to application of a magnetic field to circulation unit 230, magnet 236 may be induced to rotate continuously to induce circulation. Alternatively, the magnetic field may be applied to induce partial rotation of magnet 236 about axis 238 to thereby provide agitation to the liquid. Preferably, magnet 236 is encased in a non-corrosive coating.

Figure 9:
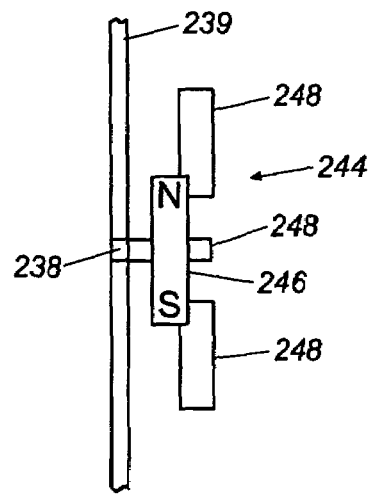
FIG. 9 is an elevated side view of an impeller assembly according to an embodiment of the present invention.

FIG. 9 is an elevated side view of circulation induction unit 244 according to an embodiment of the present invention. According to the embodiment, magnet 246 is provided with a plurality of impeller blades 248 to increase circulation of a surrounding liquid.

Figure 10:
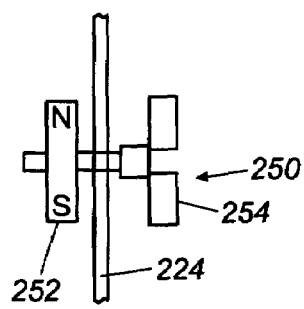
FIG. 10 is an elevated side view of another impeller assembly according to an embodiment of the present invention.

FIG. 10 is an elevated side view of circulation induction unit 250 according to an embodiment of the present invention. Magnet 252 is provided in the form of a bar magnet that is optionally coated with a non-corrosive coating. Rotation of magnet 252 induces rotation of impeller 254 with respect to partition member 224.

Figure 11:
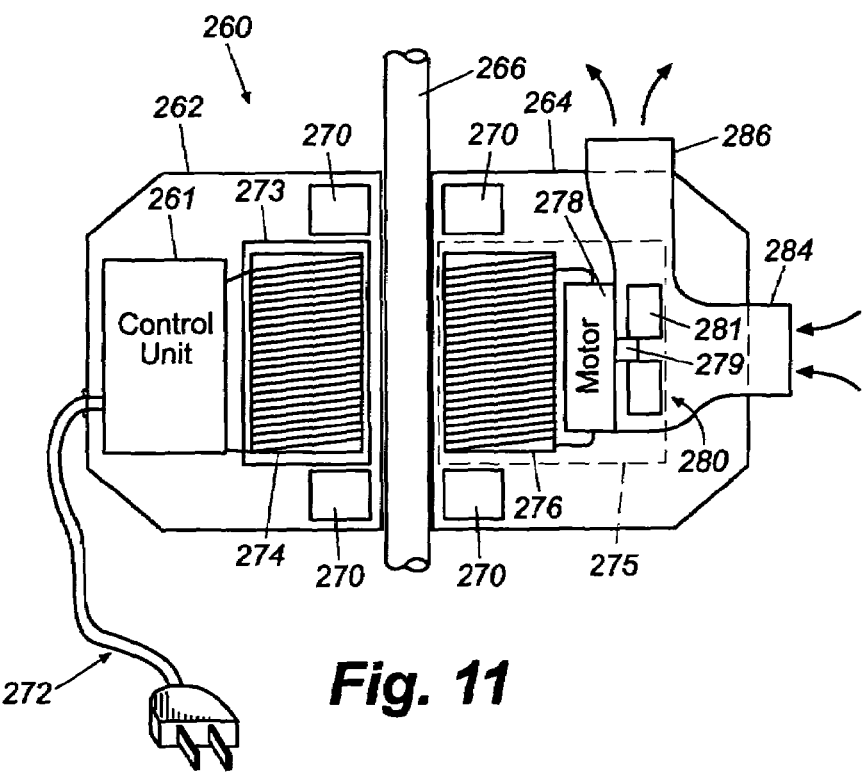
FIG. 11 is a sectional view of an induction liquid pump according to another embodiment of the present invention.

FIG. 11 is a sectional view of an induction liquid pump 260 according to another embodiment of the present invention. Induction liquid pump 260 includes power unit 262 and circulation unit 264, which are respectively attached to side wall 266 by way of a plurality of fixation units 270. Power unit 262 includes control unit 261 that transfers household power from power cord 272 to power induction unit 273. Power induction unit 273 includes power coil 274, which is comprised of an electromagnet. According to an embodiment of the invention, control unit 261 is an on/off switch. According to another embodiment of the invention, control unit 261 is merely an electrical connection such that the unit is always on, and the power used by power unit 260 is controlled by the number of windings around the core of power coil 274.

Circulation unit 264 houses circulation induction unit 275. The circulation induction unit 275 includes circulation coil 276, electric motor 278 and impeller unit 280. Circulation coil 276 produces electrical current in response to electrical current in coil 274. Accordingly, electrical current produced by coil 276 is used to power motor 278, which in turn produces rotation in rotational axis 279. The impeller unit 280 is attached to and rotates with rotational axis 279. Impeller unit 280 includes a plurality of blades 281 to agitate the surrounding liquid. When impeller unit 280 rotates continuously, liquid is drawn into intake port 284 and output from output port 286. Optionally, (not shown) the circulation unit, including motor 278, impeller 281, intake and output ports 284 and 286 and the impeller unit 280, may be separated in the tank or within the circulation unit from the power coil 276 so long as the motor 278 remains attached to the power coil 276 via an insulated conductive material, such as an insulated copper wire.

Figure 12:
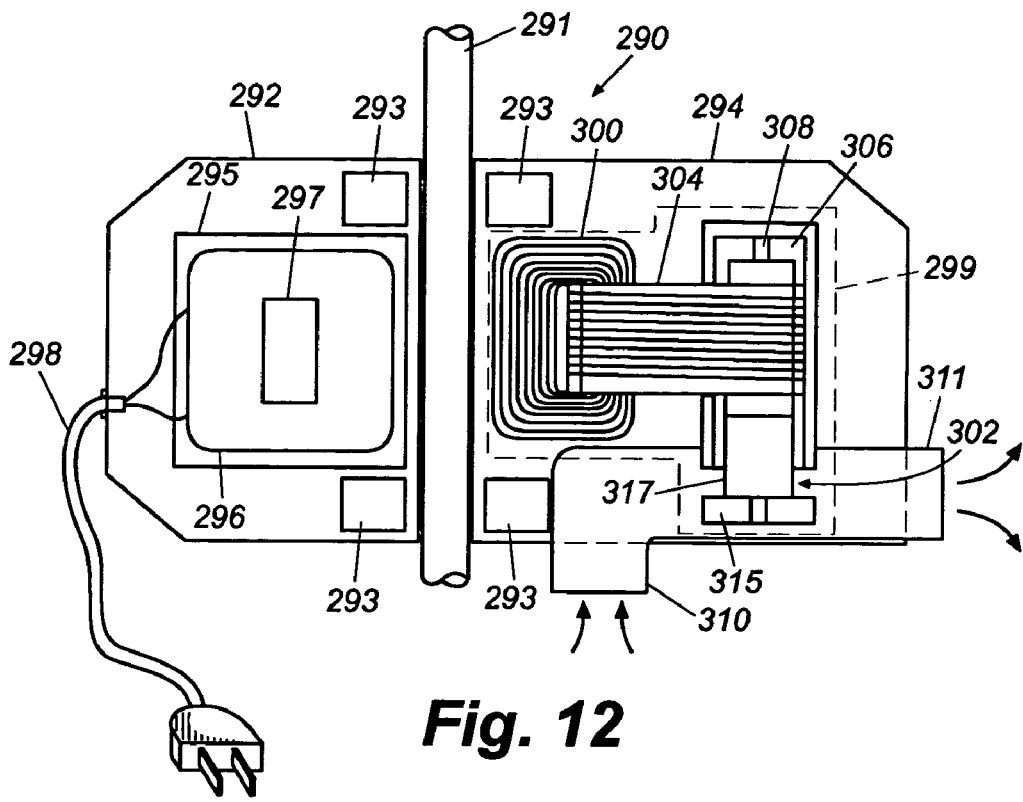
FIG. 12 is a sectional view of an induction liquid pump according to yet another embodiment of the present invention.

FIG. 12 is a sectional view of induction liquid pump 290 according to yet another embodiment of the present invention. Induction liquid pump 290 includes power unit 292, circulation unit 294, and fixation units 293. The power unit 292 and circulation unit 294 are aligned with respect to the tank wall 291. According to the embodiment, power unit 292 includes power induction unit 295. The power induction unit 295 is preferably an electrical coil 296, which is wrapped around a corresponding coil core 297. The electrical coil 296 is directly connected to household power by way of power cord 298. Power is transmitted by way of induction from power induction unit 295 to circulation induction unit 299.

Circulation induction unit 299 includes electrical coil 300, impeller assembly 302, pole plates 304 and rotational axis 308. Current in electrical coil 296 induces electrical current in electrical coil 300. Electrical coil 296 transmits power to impeller assembly 302 by way of pole plates 304. Impeller assembly 302 rotates within structural recess 306 about rotational axis 308. According to an embodiment of the invention, both coils 296 and 300 are copper windings about an iron core and are encased in a thermoplastic resin to resist corrosion. Operation of circulation unit 294 draws liquid into intake port 310 and out of output port 311.

Figure 13:
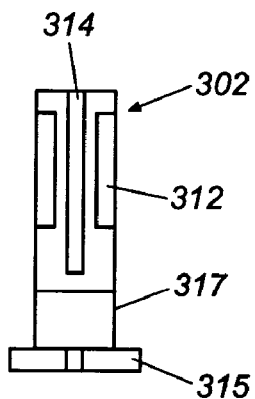
FIG. 13 is a side sectional view of the impeller assembly of FIG. 12.
Figure 14:
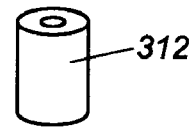
FIG. 14 is a perspective view of the magnet of the impeller assembly of FIG. 13.
Figure 15:
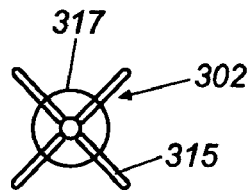
FIG. 15 is a bottom view of the impeller assembly of FIG. 13.
Figure 16:
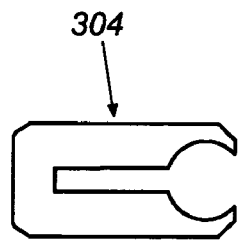
FIG. 16 is a top view of a magnet pole forming part of the induction liquid pump of FIG. 12.

FIG. 13 is a sectional view of impeller assembly 302 used in the induction liquid pump 290 of FIG. 12. FIG. 14 is a perspective view of magnet 312. FIG. 15 is a bottom view of impeller assembly 302 and FIG. 16 is a top view of a pole plate 304. As particularly illustrated in FIG. 16, impeller assembly 302 defines a cylindrical recess 314, such that impeller assembly 302 rotationally mates with rotational axis 308 within structural recess 306 of circulation unit 294. Preferably coil 300 and pole plate 304 are encased in thermoplastic resin within the body of circulation unit 294. The illustrated embodiment of FIGS. 12-16 is designed for continuous operation, with power being determined by the number and ratio of copper coils both coil 296 and coil 300. The application of a varying magnetic field by pole plates 304 induces rotation of cylindrical magnet 312, thereby turning impeller unit 317. Impeller unit 317 includes a plurality of impeller blades 315 to agitate a surrounding liquid.

FIG. 17 is partial sectional view of a magnetic tank scrubber unit 400 according to an embodiment of the present invention. As used herein the term "magnet" or "magnetic," while referring to permanent magnets, may optionally refer to electromagnets. Scrubber unit 400 includes power unit 402 and pad unit 404. Power unit 402 includes body casing 408, which connects to conventional household current by way of power cord 410. Power is supplied from power cord 410 to power induction unit 411. According to an embodiment of the invention, power induction unit 411 includes electrical motor 412 and AC/DC converter 413. In this embodiment, the power cord 410 is permanently connected to power induction unit 411 to supply power during operation. According to another embodiment of the invention, the power cord 410 incorporates a ground fault interruption switch or fuse (not shown) or a transformer (not shown).

According to another embodiment of the invention, the power cord 410 is eliminated, and power is supplied to electrical motor 412 by way of internal battery 416. According to an embodiment, battery 416 is a conventional disposable battery that is replaced after power is drained therefrom. Battery 416 is retained within a battery compartment that is accessible by way of a battery door (not shown). According to another embodiment of the invention, battery 416 is a rechargeable battery that may be removed from the battery compartment and recharged after the power has been drained therefrom.

According to another embodiment of the invention, battery 416 is a rechargeable battery that is charged by way of electrical connection of power cord 410 to a household power source. According to this embodiment, power cord 410 removably plugs into a socket (not shown) located in body casing 408. Thus, during operation of power unit 402, the power cord 410 is removed from the socket and the power unit 402 is powered by battery 416. After use, power cord 410 is reattached to the socket to maintain continuous charge to battery 416 through AC/DC converter 413.

According to another embodiment of the invention, the AC/DC converter 413 is combined with power cord 410 to form a power cord/converter outside of body casing 408. In this embodiment, the power cord/converter removably plugs into a socket (not shown) located in body casing 408. Thus, during operation of power unit 402, the power cord/converter is removed from the socket and the power unit 402 is powered by battery 416. After use, the power cord/converter is reattached to the socket to maintain continuous charge to battery 416. This embodiment reduces weight of hand held power unit 402.

According to an embodiment of the invention, variable control unit 415 is electrically connected to power induction unit 411. Variable control unit is manually operated by the user to control the speed of rotation of motor 412. Optionally, hand held power unit 402 is manually operated by the user to control the speed of rotation of the pad 404, or agitation of pad 404 or the magnetic or electromagnetic attraction between the hand held power unit 402 and the pad 404. According to an embodiment of the invention, variable control unit 415 is a variable resistor connected in series between a power source (set forth above) and motor 412.

During operation of power unit 402, motor 412 spins and/or agitates rotatable magnet 414 within body casing 408. Rotation of magnet 414 induces movement of pad unit 404. The pad unit 404 includes magnet 416 and scrubbing surface 418. According to an embodiment of the invention, scrubbing surface 418 is a plurality of plastic fibers that are affixed to permanent magnet 416 by way of adhesive. Other embodiments include abrasive cloth, brushes, and plastic coated metallic fibers. It is anticipated that a plurality of different pad units 404, having correspondingly different textured surfaces may be used in connection with power unit 402. Optionally, the magnet or magnets 416 are encased in or coated with a non-corroding material, including plastic, resin or rubber. Additionally, the magnet or magnets 416 are encased in a manner, including encased by positively buoyant water impermeable materials such as plastic or encased with at least one air pocket, which results in the entire pad unit 420 being positively buoyant.

FIG. 17A is a schematic front view of magnetic tank scrubber unit 400 according to an embodiment of the present invention. According to this embodiment, body casing 408 defines a shape that easily fits within the palm of the human hand. A plurality of fixation units 419, described in greater detail above, produce a localized magnetic field. The localized magnetic field produced by fixation units 419 attracts corresponding fixation units in embodiments of pad units described in greater detail below.

FIG. 18 is a front view of a magnetic tank scrubber pad unit 420 according to an embodiment of the present invention. FIG. 19 is a rear view of the pad unit 420 of FIG. 18. FIG. 20 is a side view of the pad unit 420 of FIG. 18. In this embodiment, a circular surface pad 422 is affixed to support structure 423. A permanent magnet 424 is affixed to support structure 423 with a plastic clip 426 or an optional adhesive. In this embodiment, the surface pad 422 rotates along with magnet 424 to clean an interior tank surface.

FIG. 21 is a front view of a magnetic tank scrubber pad unit 430 according to another embodiment of the present invention. In this embodiment, magnet 432 is affixed to a ring shaped scrubbing pad 434. FIG. 22 is a front view of a magnetic tank scrubber pad unit 440 according to another embodiment of the present invention. In this embodiment, magnet 442 is affixed to a cross shaped scrubbing pad 444.

Figure 23:
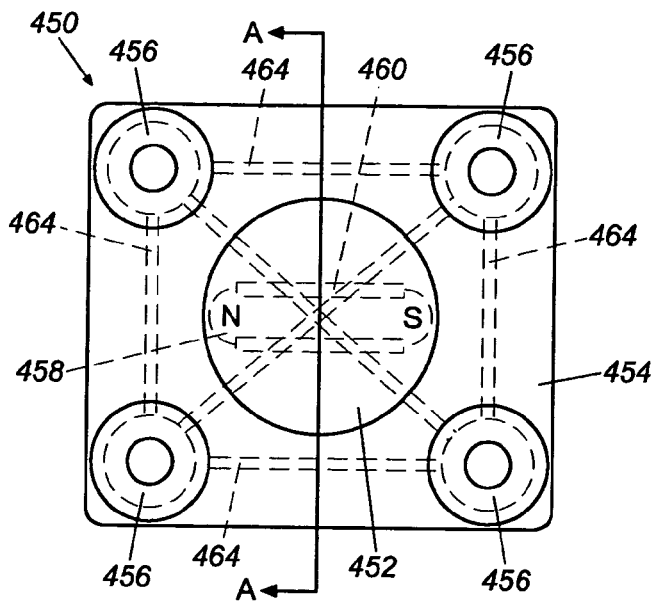
FIG. 23 is a front view of a pad unit according to an embodiment of the present invention.
Figure 24:
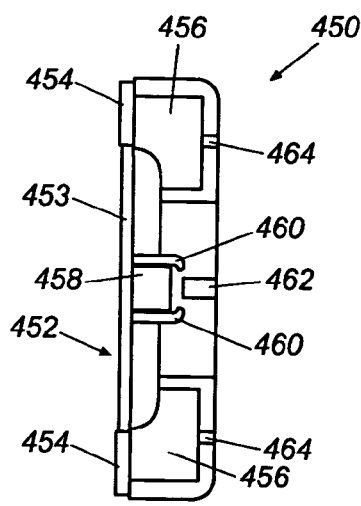
FIG. 24 is a side view of the pad unit of FIG. 23.

FIG. 23 is a front view of pad unit 450 according to an embodiment of the present invention. FIG. 24 is a side view of pad unit 450 taken along line A-A of FIG. 23. Pad unit 450 responds to operation of a corresponding power unit (not shown). Pad unit 450 includes rotatable pad section 452 having a rotatable surface pad 453 and stationary surface pad 454. A plurality of fixation units 456 track pad unit 450 with respect to a corresponding plurality of fixation units in a corresponding power unit (not shown). Fixation units 456 are preferably permanent magnets enclosed within a plastic housing.

Pad unit 450 includes a magnet 458 that is attached to pad section 452 by way of flexibly deformable elastic clips 460 or an optional adhesive. Rotation of pad section 452 is induced through application of a magnetic field, variable at the control of the operator, with respect to rotational axis 462. A plurality of reinforcing ribs 464 are disposed on the rear side of pad scrubber unit 450 to provide rigidity to the structure while also reducing weight. According to a preferred embodiment, pad section 452 rotates in response to an applied magnetic field while the entire structure tracks a corresponding power unit by way of fixation units 456. According to an alternative embodiment, pad section 452 agitates in response to an applied magnetic field.

Figure 25:
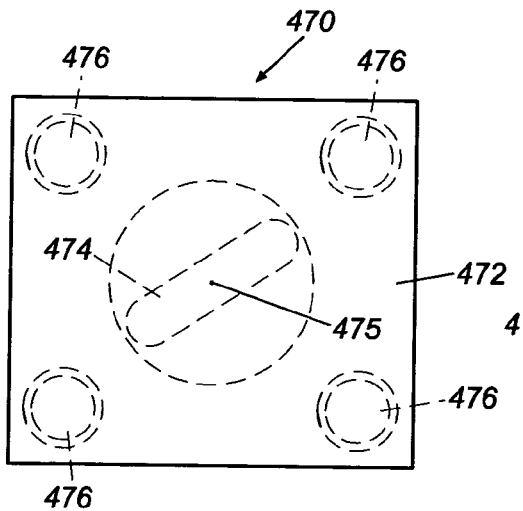
FIG. 25 is a front view of a pad unit according to another embodiment of the present invention.
Figure 26:
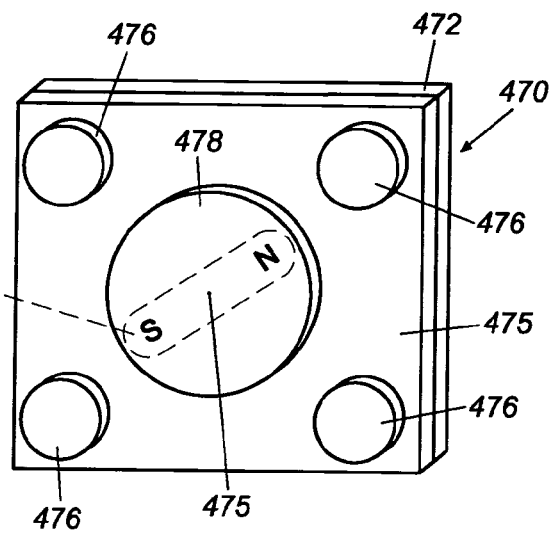
FIG. 26 is a rear view of the pad unit of FIG. 25.
Figure 27:
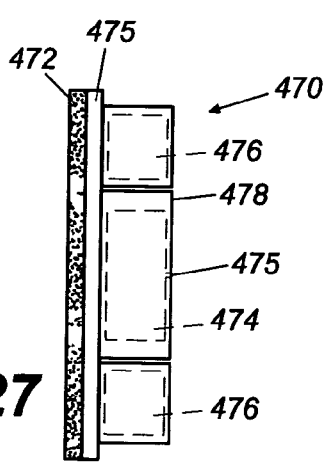
FIG. 27 is a side view of the pad unit of FIG. 25.

FIG. 25 is a front view of a pad unit 470 according to another embodiment of the present invention. FIG. 26 is a rear view of pad unit 470 of FIG. 25. FIG. 27 is a side view of pad unit 470 of FIG. 25. Pad unit 470 responds to operation of corresponding power unit (not shown). Pad unit 470 includes a single surface pad 472. A plurality of fixation units 476 track pad unit 470 with respect to a corresponding plurality of fixation units in a corresponding power unit (not shown). Fixation units 476 are preferably permanent magnets enclosed within a plastic housing. A rotatable bar magnet 474 rotates within body casing 478 about rotational axis 475 to produce vibration of pad unit 470. The amount of vibration produced is increased if the bar magnet is not perfectly balanced with respect to rotational axis 475.

It will be appreciated by those of ordinary skill in the art that the invention can be embodied in other variations, modifications, and forms without departing from the spirit or character thereof. The foregoing description is therefore considered to be illustrative and not restrictive. The scope of the invention is indicated by the appended claims, including all changes embraced by a range of equivalents thereof.

What is claimed:

1. A handheld magnetic scrubber for use in cleaning an aquarium wall:
   a. a power unit having
      (i) a first housing,
      (ii) a plurality of magnets distributed about a surface of said first housing, and
      (iii) a plurality of electromagnets orientated within said first housing, wherein said plurality of electromagnets produces a variable magnetic field in response to supplied power; and
   b. a pad unit having
      (i) a second housing,
      (ii) at least one piece of ferrous or magnetic material distributed about a surface of said second housing,
      (iii) a bore formed in said second housing, said bore having a center of radius,
      (iv) a scrubbing material releasably received in said second housing bore, wherein said scrubbing material is rotatable and radially moveable with respect to said second housing bore center of radius,
      (v) at least one piece of ferrous or other magnetic material operatively coupled to said scrubbing material so that said scrubbing material is rotatable and radially moveable with respect to said second housing bore center of radius in response to said variable magnetic field produced by said plurality of electromagnets,
   wherein when said power unit is placed on an outside of the aquarium wall and when said pad unit is placed on the inside of the aquarium wall opposite said power unit, said plurality of first housing magnets attract said pad unit at least one piece of ferrous or magnetic material to maintain said pad unit adjacent to said power unit as said scrubbing material is rotated with respect to said second housing.

2. The magnetic scrubber according to claim 1, wherein said power induction unit includes at least one electromagnet and at least one control unit,
   said control unit varies the force of magnetic attraction created by said power unit at least one electromagnet in response to power supplied from a source of electrical power, and
   said pad unit moves in response to variations in the force of magnetic attraction created by said power induction unit at least one electromagnet.

3. The magnetic scrubber according to claim 1, wherein said at least one piece of ferrous or other magnetic material is encapsulated by a water impermeable material.

4. The magnetic scrubber according to claim 1, wherein said power induction unit receives power from a power cord through a ground fault interrupting switch or fuse.

5. A handheld magnetic scrubber for use in cleaning an aquarium wall, comprising:
   a. a power unit having
      (i) a first housing,
      (ii) a plurality of magnets distributed about a surface of said first housing, and
      (iii) a power induction unit within said first housing, wherein said power induction unit produces a varying magnetic field in response to supplied power; and
   b. a pad unit having
      (i) a second housing,
      (ii) at least one piece of ferrous or magnetic material distributed about a surface of said second housing,
      (iii) a bore formed in said second housing, (iv) a scrubbing material releasably received in said second housing bore, wherein said scrubbing material is eccentrically rotatable with respect to said second housing, (v) at least one piece of ferrous or other magnetic material operatively coupled to said scrubbing material so that said scrubbing material is eccentrically rotatable in response to said varying magnetic field produced by said power induction unit, wherein when said power unit is placed on an outside of the aquarium wall and when said pad unit is placed on the inside of the aquarium wall opposite said power unit, said plurality of first housing magnets attract said pad unit at least one piece of ferrous or magnetic material to maintain said pad unit adjacent to said power unit as said scrubbing material is rotated with respect to said second housing.

6. The magnetic scrubber according to claim 5, said power induction unit having an electric motor that rotates at least one magnet to thereby produce a variable magnetic field in response to power supplied from a source of electrical power, wherein said pad unit rotates in response to rotation of said magnet.

7. The magnetic scrubber according to claim 5, wherein said at least one piece of ferrous or other magnetic material is sealed in a water impermeable material and induces agitation of said pad unit to scrub the second side of the tank side wall or bottom.

8. The magnetic scrubber according to claim 5, wherein said power induction unit has at least one electromagnet and a control unit which produce a variable magnetic field in response to the power supplied from a source of electrical power, and said pad unit moves in response to said variable magnetic field.

9. The magnetic scrubber according to claim 5, wherein said power induction unit having a plurality of electromagnets and a control unit, said control unit having at least one control surface by which the user may control the force of magnetic attraction created by said power unit electromagnet in response to power supplied from a source of electrical power, and said pad unit moves in response to variations in the polarity of said power induction unit plurality of electromagnets.

10. The magnetic scrubber according to claim 5, wherein said power induction unit having at least two electromagnets and at least one control unit, said control unit varies the magnetic polarity created by said at least two electromagnets in response to power supplied from a source of electrical power, and said at least one piece of ferrous or other magnetic material moves in response to variations in the magnetic polarity created by said at least two electromagnets.

11. The magnetic scrubber according to claim 5, wherein said pad unit is positively buoyant.

12. The magnetic scrubber according to claim 5, wherein said power induction unit receives power from a power cord.

13. The magnetic scrubber according to claim 5, wherein said power induction unit receives power from a battery.

14. The magnetic scrubber according to claim 5, wherein said power induction unit receives power from a power cord and transformer.

15. A handheld magnetic scrubber for use in cleaning an aquarium wall, comprising:

a. a power unit having
 (i) a first housing,
 (ii) a plurality of magnets distributed about a surface of said first housing, and
 (iii) a plurality of electromagnets mounted within said first housing, wherein said plurality of electromagnets produce a varying magnetic field in response to changes in power supplied to each of said plurality of electromagnets; and b. a pad unit having
 (i) a second housing,
 (ii) at least one piece of ferrous or magnetic material distributed about a surface of said second housing,
 (iii) a bore formed in said second housing,
 (iv) a scrubbing material releasably received in said second housing bore, wherein said scrubbing material is rotatable with respect to said second housing,
 (v) at least one piece of ferrous or other magnetic material operatively coupled to said scrubbing material so that said scrubbing material rotationally moves in response to said varying magnetic field produced by said plurality of electromagnets, wherein when said power unit is placed on an outside of the aquarium wall and when said pad unit is placed on the inside of the aquarium wall opposite said power unit, said plurality of first housing magnets attract said pad unit at least one piece of ferrous or magnetic material to maintain said pad unit adjacent to said power unit as said scrubbing material is rotated with respect to said second housing.

* * * * *

UNITED STATES PATENT AND TRADEMARK OFFICE
CERTIFICATE OF CORRECTION

| | | |
|---|---|---|
| PATENT NO. | : 7,313,840 B2 | Page 1 of 1 |
| APPLICATION NO. | : 10/627946 | |
| DATED | : January 1, 2008 | |
| INVENTOR(S) | : Gene Watkins | |

It is certified that error appears in the above-identified patent and that said Letters Patent is hereby corrected as shown below:

In column 9, line 21, please delete the reference number "182" and replace with --82--.

Signed and Sealed this

Twenty-fourth Day of June, 2008

JON W. DUDAS
*Director of the United States Patent and Trademark Office*